Patented Dec. 12, 1939

2,183,489

UNITED STATES PATENT OFFICE 2,183,489

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Application June 6, 1938, Serial No. 212,123. In Germany June 9, 1937

4 Claims. (Cl. 260—199)

The present invention relates to monoazo dyestuffs, more particularly to those of the general formula:

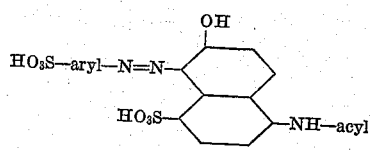

wherein aryl means a radicle of the benzene series, the —SO₃H group being attached thereto in o-position to the azo group and no halogen atom standing in the other o-position to the azo group.

The new dyestuffs may be prepared by combining the diazo compounds of aromatic amines of the general formula: HO₃S—aryl—NH₂, wherein aryl means a radicle of the benzene series, the —SO₃H group being attached thereto in o-position to the amino group and no halogen atom standing in the other o-position to the amino group, with 1-acylamino-6-naphthol-4-sulfonic acids of the general formula:

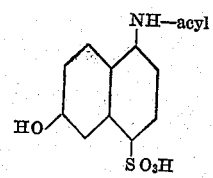

The monoazo dyestuffs thus obtained dye wool and silk clear orange shades of very good fastness to light, and most of the dyestuffs possess a very good levelling power. They are distinguished from the known azo dyestuffs prepared by employing isomeric acylaminonaphtholsulfonic acids as coupling components by better fastness to seawater and perspiration.

Hitherto the coupling components employed for the manufacture of the present new dyestuffs have not been described or applied for the manufacture of azo dyestuffs. They may be prepared for instance by treating 1-amino-6-naphthol-4-sulfonic acid with acylating agents according to known methods.

The present new dyestuffs may also be prepared by combining the above described diazo compounds with 1-amino-6-naphthol-4-sulfonic acid in an alkaline medium and treating the monoazio dyestuff thus obtained with acylating agents.

In order to further illustrate my invention the following examples are given, the parts being by weight.

Example 1

17.3 parts of 1-aminobenzene-2-sulfonic acid are diazotized in the usual manner and the diazo solution obtained is allowed to run into an aqueous solution of 29 parts of 1-acetyl-amino-6-naphthol-4-sulfonic acid containing an excess of sodium carbonate. When the combination is complete, the dyestuff formed of the formula:

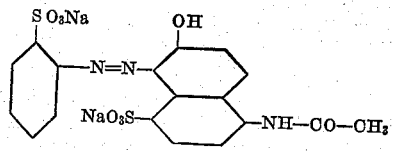

is separated and dried. It is a bright orange red powder, soluble in water and dyeing wool and silk clear orange shades of excellent fastness to light. The dyestuff exhibits a very good levelling power.

Similar orange dyestuffs which are distiguished by a likewise excellent fastness to light and in some cases by a still increased fastness to washing and perspiration are obtained by employing as coupling component for the above example 1-methoxy - acetylamino - 6 - naphthol-4-sulfonic acid, 1 - phenoxyacetylamino - 6-naphthol-4-sulfonic acid, 1-chloracetylamino-6-naphthol-4-sulfonic acid, 1-benzenesulfonylamino-6-naphthol-4-sulfonic acid, 1-carboethoxyamino-6-naphthol-4-sulfonic acid and the like.

Example 2

21.8 parts of 3-nitro-1-aminobenzene-6-sulfonic acid are diazotized in the usual manner and the diazo solution obtained is combined with an aqueous solution of 29 parts of 1-acetylamino-6-naphthol-4-sulfonic acid containing an excess of sodium carbonate. The dyestuff formed of the formula:

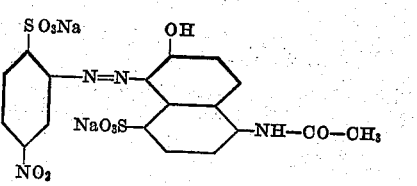

is separated and dried. It is an orange-brown powder, soluble in water, dyeing wool from an acid bath yellowish-orange shades of good fastness to perspiration and very good fastness to light and seawater. The dyestuff has a good levelling power.

By employing as diazo component for instance 1-aminobenzene - 2- sulfonic acid, 4 - methyl-3- chlor - 1 - aminobenzene-6-sulfonic acid or 1-acetylamino - 3 - aminobenzene - 4-sulfonic acid, similar dyestuffs are obtained which are distinguished by a good levelling power and a very good solubility in water, and which dye wool somewhat more reddish-orange shades of very good fastness to light.

Example 3

25.1 parts of 2-amino-4-methylsulfonylbenzene-1-sulfonic acid are diazotized and the suspension of the diazo compound formed is combined with an aqueous solution of 29 parts of 1-aceytlamino-6-naphthol-4-sulfonic acid containing an excess of sodium carbonate. When the combination is complete, the dyestuff formed of the formula:

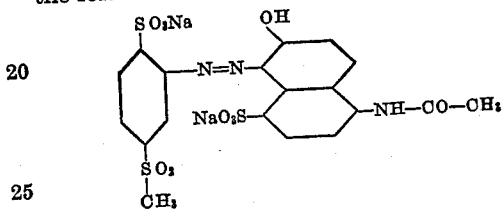

is separated and dried. It is an orange powder, soluble in water, dyeing wool very yellowish orange shades of very good fastness to light. The dyestuff has a good levelling power.

Example 4

17.3 parts of 1-aminobenzene-2-sulfonic acid are diazotized in the usual manner and the diazo solution obtained is allowed to run into an aqueous solution of 34 parts of 1-($\beta$-chloropropionylamino)-6-naphthol-4-sulfonic acid containing an excess of sodium carbonate. When the combination is complete, the dyestuff formed of the formula:

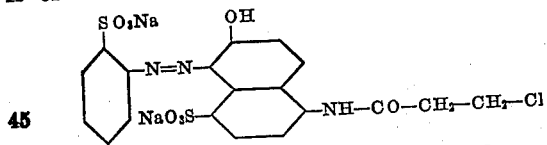

is separated and dried. It is a reddish-orange powder, soluble in water, dyeing wool from an acid bath clear orange shades of excellent fastness to light and good fastness to washing and perspiration.

By employing as coupling component for the above example the corresponding amount of 1-($\beta$-chlorobutyrylamino) - 6-naphthol - 4 - sulfonic acid a similar dyestuff is obtained which is distinguished by an increased levelling power and yields on wool somewhat more yellowish orange shades.

Example 5

The diazo solution obtained by diazotizing 17.3 parts of 1-aminobenzene-2-sulfonic acid is allowed to run into an aqueous solution of 35 parts of 1-benzoylamino-6-naphthol-4-sulfonic acid containing an excess of sodium carbonate. The dyestuff formed of the formula:

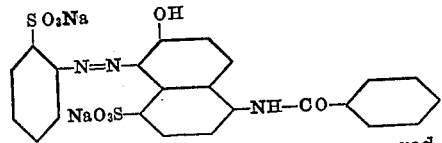

is separated and dried. It is an orange-red powder, soluble in water, dyeing wool from an acid bath very bright orange shades of very good fastness to light and good fastness to washing and perspiration. The dyestuff has a good levelling power.

I claim:
1. The monoazo dyestuffs of the general formula:

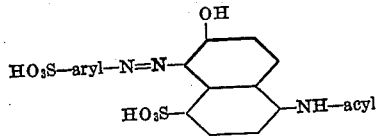

wherein aryl means a radicle of the benzene series, the —SO₃H group being attached thereto in o-position to the azo group and no halogen atom standing in the other o-position to the azo group, which dyestuffs dye wool and silk clear orange shades of very good fastness to light.

2. The monoazo dyestuff of the formula:

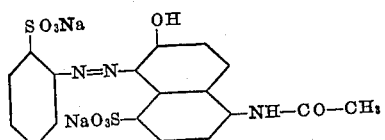

which dyestuff is an orange-red powder, soluble in water, dyeing wool and silk clear orange shades of excellent fastness to light and of good levelling power.

3. The monoazo dyestuff of the formula:

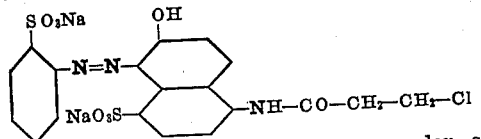

which dyestuff is a reddish-orange powder, soluble in water, dyeing wool clear orange shades of excellent fastness to light and good fastness to washing and perspiration.

4. The monoazo dyestuff of the formula:

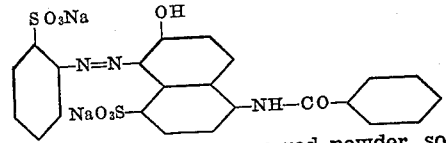

which dyestuff is an orange-red powder, soluble in water, dyeing wool very bright orange shades of very good fastness to light, good fastness to washing and perspiration and of good levelling power.

RICHARD FLEISCHHAUER.